S. B. FREELAND.
SPLIT GEAR.
APPLICATION FILED APR. 25, 1912.

1,039,375.

Patented Sept. 24, 1912.

WITNESSES:
Geo. W. Smith
Christine A. Braidel.

INVENTOR
Stephen B. Freeland
BY
Geo. B. Willcox ATTORNEY

UNITED STATES PATENT OFFICE.

STEPHEN B. FREELAND, OF SAGINAW, MICHIGAN.

SPLIT GEAR.

1,039,375. Specification of Letters Patent. Patented Sept. 24, 1912.

Application filed April 25, 1912. Serial No. 693,016.

*To all whom it may concern:*

Be it known that I, STEPHEN B. FREELAND, a citizen of the United States, residing at Saginaw, in the county of Saginaw and State of Michigan, have invented certain new and useful Improvements in Split Gears; and I do hereby declare the following to be a full, clear, and exact description of the invention, such as will enable others skilled in the art to which it appertains to make and use the same.

This invention is a split gear and pertains more particularly to the construction and arrangement of the parts of a split bevel gear.

The invention relates more especially to bevel gears such as are commonly employed on the long shafts of roll drives, to operate the live rolls. Such roll drives consist of a long shaft carrying a number of bevel gears that mesh with corresponding gears on the individual rolls, the rotation of the drive shaft thus actuating all of the rolls simultaneously.

In practice, when a gear located near the middle of the shaft becomes worn or breaks, all the gears on one end of the shaft must be taken off in order to replace the broken one, thus requiring a considerable amount of labor and expense.

It is the object of my invention to provide a gear of the split type that can be easily removed without disturbing the other gears on the shaft, and the invention also comprises certain details of construction whereby the gear is made of great strength and capable of resisting the twisting and shearing actions that are brought upon it by reason of the combined circumferential pull on the teeth, and the axial thrust which is always present in bevel gears under load.

With these and certain other objects in view which will appear later in the specification, the invention consists in the devices described and claimed and the equivalents thereof.

Figure 2:
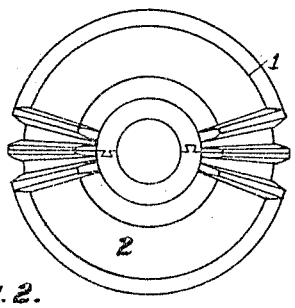
Figure 3:
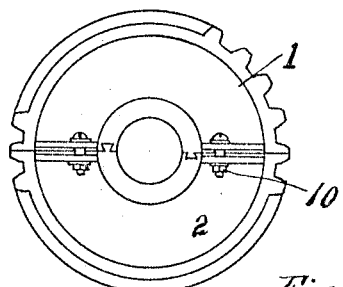
Figure 1:
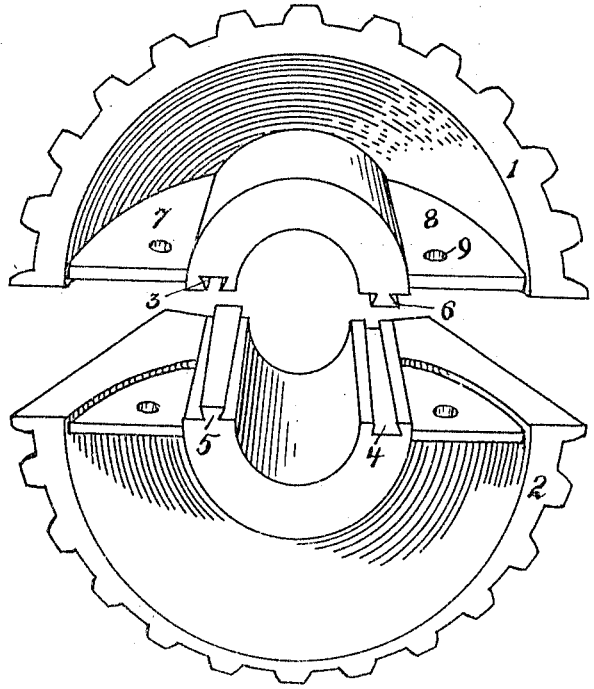
Figure 4:
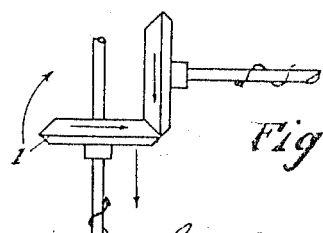

In the drawings, Figure 1 is a perspective view showing the backs of the two halves of a bevel gear embodying my invention; Fig. 2 is a front view of the two halves assembled, some of the teeth being omitted; Fig. 3 is a rear view of the same; and Fig. 4 is a diagrammatic view showing the relation of the driving and driven gears.

As is clearly shown in the drawings, the device consists in a split gear consisting of two members 1, 2, the split faces of the hubs being provided with dove-tailed mortises 3, 4 and corresponding tenons 5, 6.

Each of the members 1, 2 is provided with a pair of radially extending webs 7, 8 having bolt holes 9 to receive the clamping bolts 10. When the members 1, 2 are assembled the upper and lower webs are separated, as shown in Fig. 3. The dove-tailed mortises and tenons permit of assembling the members 1, 2 by sliding them together endwise until the holes 9 are in register, after which the bolts 10 are inserted and clamped tight. The dove-tailed mortises and tenons not only assist in reinforcing the bolts 10 against the tendency of the members to separate, but also take the twisting and shearing strain that would otherwise be brought on the bolts 10 by reason of the tendency of the halves of the split gear to rotate in the direction indicated by the arrow 11 in Fig. 4 when the gears are in action, this rotating or shearing tendency being produced by the combined tangential action of the driven gear and the axial thrust brought upon the split gear in the direction shown by the arrow at 12.

By the means above described I have produced a simple gear that can be manufactured at comparatively small expense, that is strong and durable and easily replaced on a long shaft in case of wear or damage.

Having described my invention, what I claim and desire to secure by Letters Patent, is:

In a bevel gear, the combination of the two gear members, each formed with a pair of radially extending webs connecting the hub of said gear with the rim, the faces of the hub members being formed with longitudinally arranged dove-tailed tongues and grooves respectively, and bolts for clamping said webs together.

In testimony whereof I affix my signature in presence of two witnesses.

STEPHEN B. FREELAND.

Witnesses:
JOHN H. SLEIBEL,
CHRISTINE A. BRAIDEL.